March 14, 1961 W. S. MILLER 2,974,565
PROJECTION SYSTEM USING SCREEN WITH FACETS
Original Filed Feb. 3, 1955 3 Sheets-Sheet 1
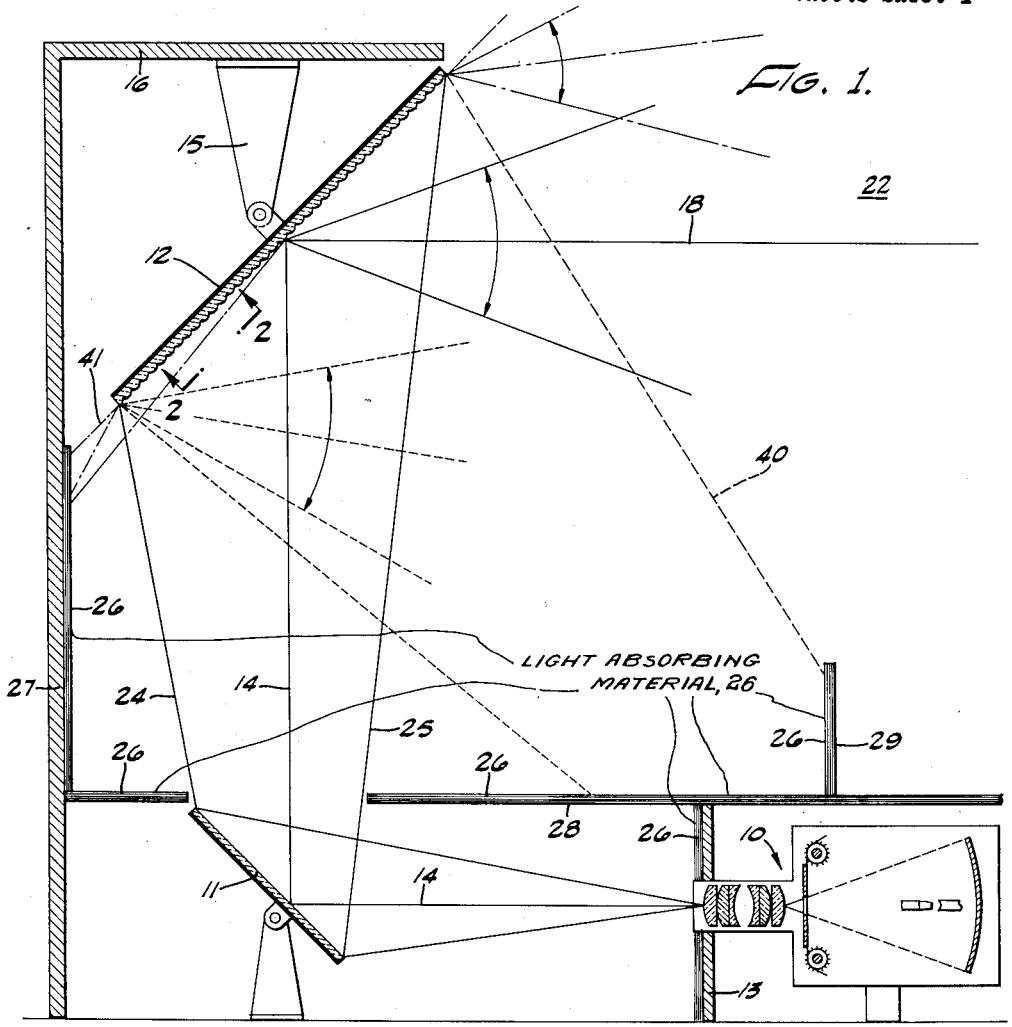
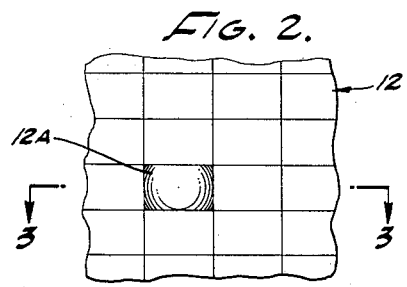
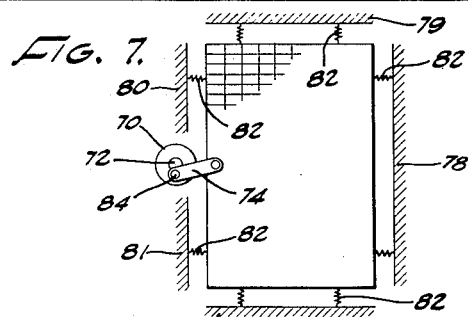
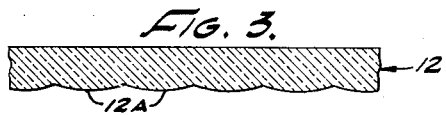
INVENTOR.
WENDELL S. MILLER
BY
ATTORNEYS March 14, 1961 W. S. MILLER 2,974,565
PROJECTION SYSTEM USING SCREEN WITH FACETS
Original Filed Feb. 3, 1955 3 Sheets-Sheet 2
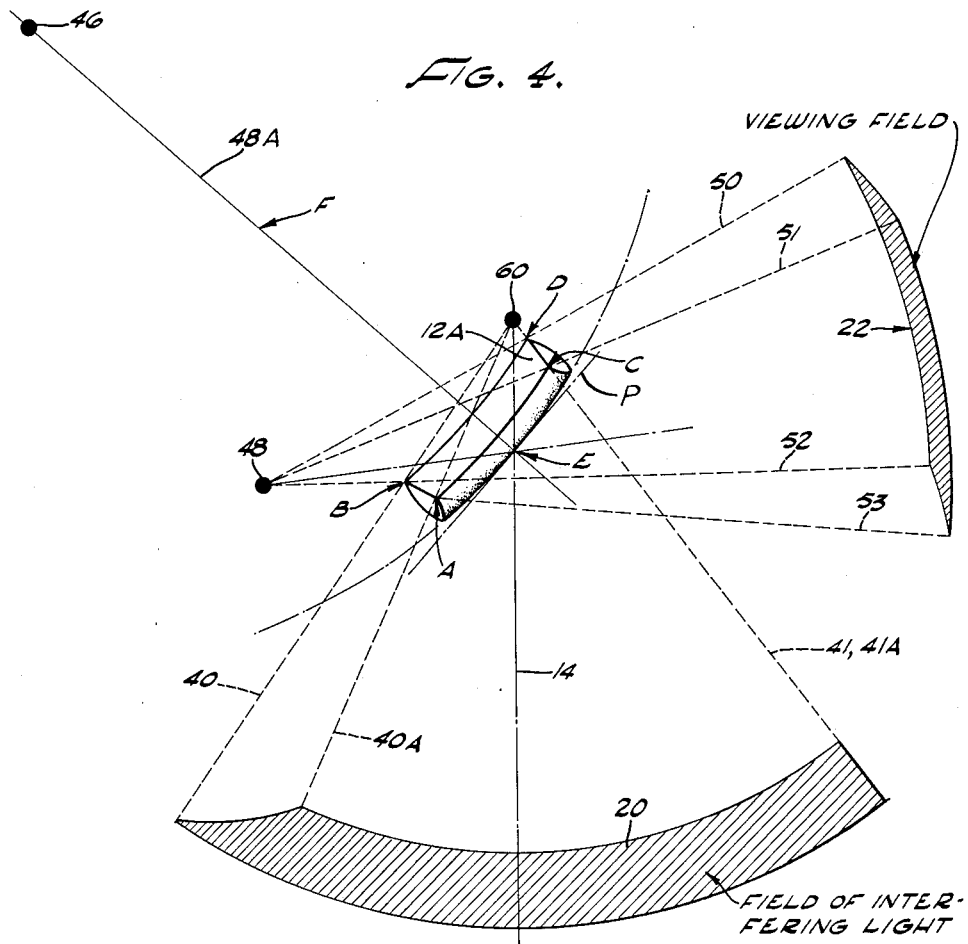
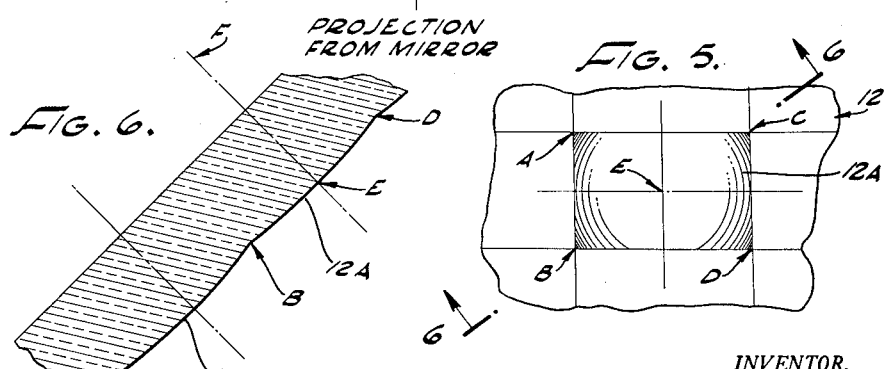
INVENTOR.
WENDELL S. MILLER
BY
ATTORNEYS

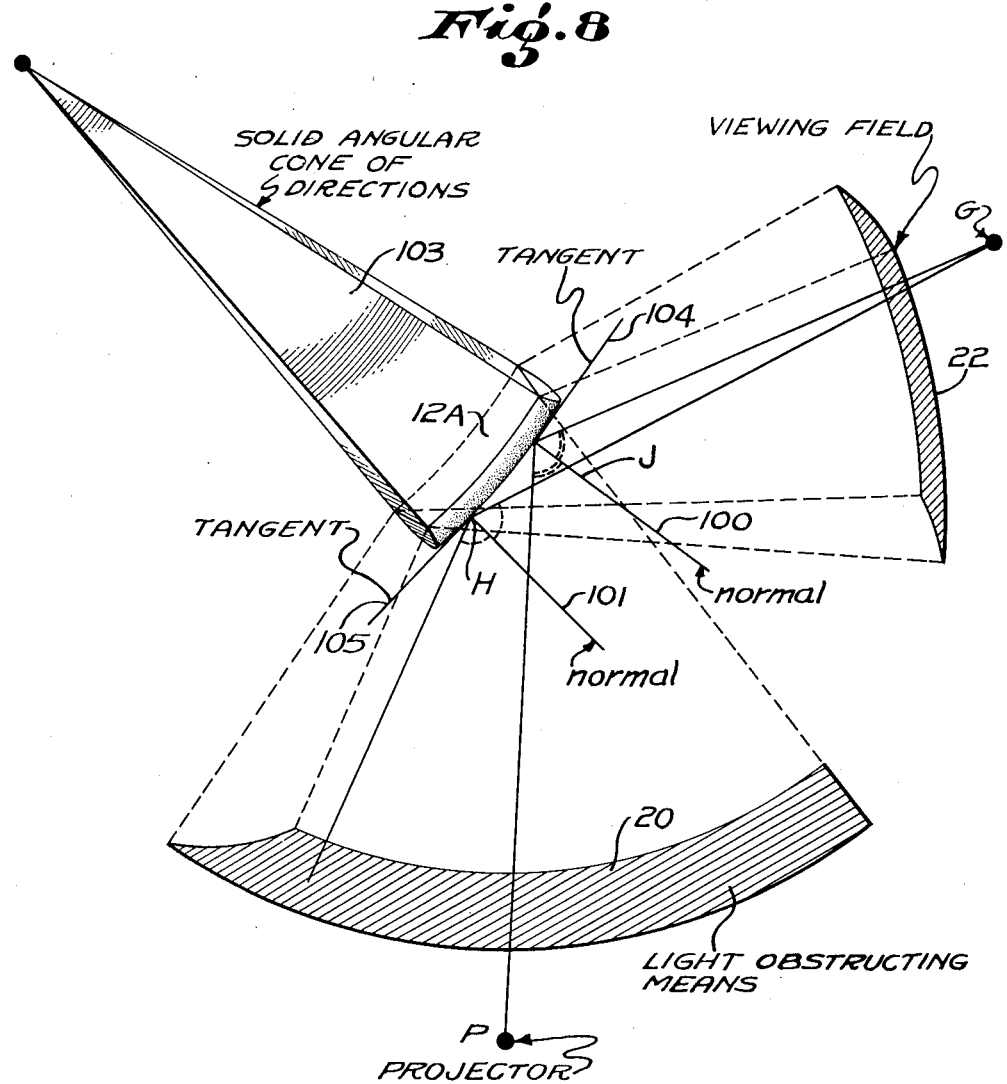

United States Patent Office 2,974,565
Patented Mar. 14, 1961

2,974,565

PROJECTION SYSTEM USING SCREEN WITH FACETS

Wendell S. Miller, 1341 Comstock Ave., Los Angeles 21, Calif.

Continuation of application Ser. No. 485,987, Feb. 3, 1955. This application May 12, 1958, Ser. No. 734,656

12 Claims. (Cl. 88—24)

The present invention relates to improved means and techniques useful in projecting either still or motion pictures and has particular applicability in those instances wherein it is desired to view projected pictures in rooms or areas such as drive-in theatres wherein the ambient light intensity is otherwise prohibitively high. The present application is a continuation of my copending application, Serial No. 485,987, filed February 3, 1955, and now abandoned.

In general, the present system involves a specular reflection multi-facet screen with means for supporting such screen at an angle inclined to the axis of a projected beam and a light absorbent structure which absorbs that ambient light which otherwise might be reflected into the viewing area from the direction of the screen.

Another specific object of the present invention is to provide a system of this type in which a focus screen consisting of a plurality of reflecting facets is inclined both with respect to the projection axis and the viewing axis with such facets arranged to reflect light into the viewing area from a predetermined area which includes the projection axis with, however, the provisions in such area for absorbing that light which otherwise might result in dilution of the reflected picture that is being projected along said projection axis.

Another object of the present invention is to provide an improved projection system of this type with provisions for moving the screen to enhance the picture quality.

The features of the present invention which are believed to be novel are set forth with particularity in the appended claims. This invention itself, both as to its organization and suggested manner of operation, together with further objects and advantages thereof, may be best understood by reference to the following description taken in conjunction with the accompanying drawings in which:

Figure 1 illustrates a section through a projection system embodying features of the present invention.

Figure 2 is a view in elevation taken generally on the line 2—2 of Figure 1.

Figure 3 is a sectional view taken on the line 3—3 of Figure 2.

Figure 4 illustrates generally that field or area from which light may be reflected from an individual facet of the composite screen illustrated in Figure 1 into the viewing area.

Figure 5 is a plan view looking at the reflecting surface of the facet illustrated in Figure 4.

Figure 6 is a sectional view taken generally on the line 6—6 of Figure 5.

Figure 7 illustrates one way in which the picture may be moved for enhanced picture quality.

Figure 8 illustrates other features of the present invention.

As illustrated in Figure 1, the optical system includes a projection system which is illustrated herein as a motion picture projector and serves to project a picture on to a mirror 11 which may be plane, but which is preferably shaped to minimize or eliminate astigmatism and curvature field so that the same may be reflected on to the screen 12 in focus for the general purpose of projecting pictures in the general area indicated by the numeral 22. For example, the mirror 11 may be cylindrical, elliptical or may, instead, be a prism.

It is understood that instead of a motion picture projector 10, a projector of still pictures, television pictures or other types may be used and in each case, the projector may be positioned to project pictures directly on to the screen 12 without the aid of the reflecting mirror 11. In other words, the projector 10 may be positioned at the virtual image point of the mirror 11 on an extension of the central beam 14 which is understood to represent the main or central projection axis. It is observed that this projection axis 14 is inclined with respect to the general plane of the screen 12. Such screen 12 may be pivotally mounted in an adjusted position on the bracket 15 which extends downwardly from the stationary supporting structure 16. It is noted also that the viewing axis corresponds generally to the line 18, this line 18 also being inclined with the general plane of the screen 12 and such line 18 serves to indicate the central position of those light beams which are reflected on to the viewing area or field 22.

The screen 12 comprises a plurality of light reflecting facets which may take many different forms and shapes, either concave or convex, and which are illustrated specifically herein as facets having a spherical convex reflecting surface. Preferably, these reflecting surfaces may have a projected area which is generally rectangular as illustrated in Figures 2 and 5, for ease of manufacture, so that the longer dimension of the rectangle extends in the horizontal plane to thereby provide a corresponding viewing field which extends a greater distance in the horizontal direction than in the vertical direction. However, these facets may be so shaped that so-called keystone effects are avoided so that the viewing cone extending from point 48 through field 22 is of such shape as may be desired.

One of these facets 12A is illustrated in a three-dimensional representation in Figure 4, the corners thereof being designated by A, B, C, D and these letters correspond to the same corners illustrated in Figure 5.

Each of these facets 12A is capable of reflecting light which may be directed at it from the field or area represented by the shaded area 20 in Figure 4 and to reflect some of such light from such field 20 into the solid cone of viewing field defined by the point 48 and the shaded area or field 22 in Figure 4. Such reflection is from the surface of the individual facets from planes tangent to the outer surfaces. One of such tangent planes is represented in Figure 4 by the line P which is tangent to the face of the facet at point E. There is also indicated in Figure 4 by the extension of the line 48 through point E, the principal beam of the projected light source represented by the line 14. As a matter of fact, the only light which may be reflected into the viewing area 22 from the facet 12A is that light which may be derived from the shaded area 20. This area 20 is covered with light absorbing or obstructing material so that the only light which enters the viewing field is that light being projected by the projector.

This means that when the screen 12 is not being illuminated by the projector, the screen 12 appears dark to a viewer in the viewing field 22 even though the ambient light intensity is relatively high.

It is understood that each of the facets or elements 12A serves to reflect into field 22 the corresponding elemental portion of the image of the entire picture which is being focused by the projector 10 on that facet. In other words, these elemental portions of the image reflected from the facets 12A are combined optically in the viewing field 22 so that the viewer sees one complete picture. In order to improve the resolution, these facets 12A are preferably made as small as possible, consistent with good adherence to their desired shape and ease and inexpensiveness of manufacture. In order to improve the resolution while yet keeping the facet size relatively large (i.e., improve the quality or appearance of the viewed picture so that the same does not appear to be a composite of elemental portions) the screen 12 as a whole may be oscillated through a relatively small distance in the plane of the screen, at a frequency such that the apparent transverse movement of a spot of reflected light coming from each facet is obscured by persistence of vision. Thus, means may be provided for oscillating the screen 12 about in its plane as shown in Figure 7.

It is observed that the area 20 is relattively large, being much larger than the area defined by the light beam from the projector 10 and for that reason, under usual conditions of ambient light, would be capable of supplying more illumination to the screen than the projector. In accordance with important features of the present invention, such area corresponding to the area 20 comprises the area of light absorbing material. Thus the area of the projected beam is defined generally in Figure 1 by the outside lines 24 and 25 which extend between the mirror 11 and the screen 12. This area 24, 25 thus defined, is much smaller than the area 20 represented in Figure 4. While the projected beam passes through such area 20, the remaining portion of such area 20 is lined with light absorbing material as for example, the light absorbing material 26 on the face of the vertical wall or baffle 27, the light absorbing material 26 on the horizontal extending stationary member 28 and the light absorbing material 26 on the other vertical extending wall 29. It is noted that the light baffle 13 is also lined with light absorbing material 26 since, optically speaking, the same may be considered to define a portion of the area 20. This is particularly obvious when no mirror 11 is being used.

It is apparent that the vertical baffles 27 and 29 may be omitted but in such case, a corresponding greater portion of the horizontal extending baffle 28 must be covered with light absorbing material 26. Also, instead of being vertical, these baffles 27 and 29 may extend upwardly at any other angle so long as their upper edges intercept the lines 41 and 40, respectively. The effect of the baffles 27 and 29 is to render the system more compact. The baffle 29 extends upwardly a sufficient height so as not, however, to block out the light which is being reflected from the screen 12 into the viewing area 22.

In other words, that area generally within the limiting lines 40 and 41 should be covered with light absorbing material so that there is minimum reflection of ambient light which otherwise might produce dilution of the image; i.e., impair the contrast in the viewing area or field 22.

This field 20, thus defined by the lines 40 and 41 in both Figures 1 and 4, is referred to generally as the field 20 of interfering light but it is within this field and through this field that the beam 14 is projected.

The relationship between the fields 20 and 22 may be determined graphically, knowing the dimensions and curvature of the facet 12A and observing the optical rule that the angle of incidence as measured from the normal to a reflecting surface is equal to the angle of reflection also measured from the normal to such a surface. The center of curvature of the reflecting surface is designated in Figure 4 by the point 46 and the radius of curvature is designated by the line 48A.

The virtual image point in the reflecting facet 12A is designed by the point 48 at which the lines 50, 51, 52 and 53 also converge. These lines 50, 51, 52 and 53 define the outer points of the viewing field 22 and pass through corresponding edges of the facet 12, as shown.

The field or area 20 is defined generally in like manner by lines 40, 40A, 41 and 41A, each converging at the common point 60 and passing through corresponding edges A, B, C and D of the facet 12A.

As illustrated in Figure 7, the screen 11 is moved in its plane by a motor driven cam arrangement which comprises a disc 70 affixed to the motor shaft 72. A link 74 is pin connected at opposite ends thereof to the disc 70 and the screen 12. The link 74 is pivotally mounted on pin 84 and a like pin serves to rigidly connect the link to the screen. The screen 12 is resiliently mounted in a stationary framework including the stationary elements 77—81 by spring means 82. Thus, as the motor shaft 72 rotates, the screen 12 is oscillated in both the horizontal direction as well as in the vertical direction.

Figure 8 serves to illustrate other features of the invention previously described. It will be seen that Figure 8 illustrates one of the reflecting elements (shown also in Figure 4) for receiving projected images on a screen in the presence of ambient light, a viewing field represented by the shading 22. Such viewing field has an unobstructed view in the face of the screen. The light obstructing means subtends an area represented by the shading 20, as seen from the screen and is disjoint from the viewing field 22. A point P which may represent the projector is optically in front of the screen and is located within the region subtended by the light obstructing means. The screen itself is represented by one of its light reflecting regions 12A which has the property and shape such that substantially all of the effective normals 100, 101; i.e., normals to the surface of the region effective in the reflection of light rays lie within a prescribed solid angular cone of directions represented by the solid cone 103. Each of such light reflecting regions 12A has its prescribed cone of directions 103 of such size and oriented with respect to the screen that for each point G within the viewing area, there is an effective normal lying within the region's prescribed cone of directions which bisects the angle between the lines from the foot of such normal to the points P and G. The light obstructing means represented by the shaded area 20 is of such size and so located with respect to the screen that for each such point G and the foot H of each effective normal lying within any of the above mentioned prescribed cones of direction 103 of any of such light reflecting regions of the creen, the line through H and in front of the screen whose angle with the line GH is bisected by the normal to the surface through H, passes through the area 20 which represents the light obstructing means.

While the particular embodiments of the present invention have been shown and described, it will be obvious to those skilled in the art that changes and modifications may be made without departing from this invention in its broader aspects and therefore, the aim in the appended claims is to cover all such changes and modifications as fall within the true spirit and scope of this invention.

I claim:
1. In a system of the character described, a screen comprising a plurality of reflecting elements, a viewing field which is subjected to ambient light adjacent said screen with the principal viewing axis of said viewing field being inclined with respect to the general plane of of said screen, beam projecting means for projecting a light beam in focus on said screen with the axis of said beam inclined with respect to said plane and also with respect to said viewing axis, said light beam passing through an area which is exclusive of said viewing field, said elements being so shaped that light only from said area and none else is reflected into said viewing field and such that said ambient light is reflected by said elements exclusively into said area, each of said elements being subjectable to substantially parallel rays and reflecting the light therefrom throughout said viewing field with substantially uniform intensity throughout the viewing field, and means in said area for preventing light other than that from the projector from entering the viewing field, so that said screen, in the absence of said light beam and in the presence of said ambient light, appears dark to a viewer in said viewing field, said light reflecting elements each providing a substantially uniform distribution of effective reflecting tangent surfaces which are uniform with respect to angle throughout a predetermined solid angular range such that from each point in the viewing field, a ray directed to the screen and reflected from any of such elemental reflecting surfaces shall then pass through the light obstructing area.

2. A system as set forth in claim 1 including means for moving said screen in its plane at such a speed that the individual reflecting elements of the screen pass through a distance corresponding to their linear dimension in no longer time than that required to achieve persistency of vision.

3. In a system for projecting images on a screen in the presence of ambient light, said screen having light reflecting elements for reflecting image portions into a viewing field, each of said elements being subjectable to substantially parallel rays and reflecting the light therefrom throughout said viewing field with substantially uniform intensity throughout the viewing field, light obstructing means defining a light obstructing area, said light obstructing area being so large and positioned with respect to the screen that light only from the light obstructing area and no other light is reflected by said screen into the viewing area so that said screen appears dark to a viewer in said viewing area, said light reflecting elements each providing a substantially uniform distribution of effective reflecting tangent surfaces which are uniform with respect to angle throughout a predetermined solid angular range such that from each point in the viewing field, a ray directed to the screen and reflected from any of such elemental reflecting surfaces shall then pass through the light obstructing area.

4. In a system for projecting images upon a viewing screen in the presence of ambient light, the combination of a screen having light reflecting elements that define said screen, light obstructing means defining a light obstructing area, and light projecting means in said area, arranged in cooperative relationship such that the light from the projecting means shall be reflected by the screen into a predetermined viewing area, each of said elements being subjectable to substantially parallel rays and reflecting the light therefrom throughout said viewing field with substantially uniform intensity throughout the viewing field, said light obstructing means being disposed on the same side of said screen as said projecting means, and said elements and said light obstructing means being so optically interrelated that, as viewed from any point in the viewing field, the optically reflected image of the light obstructing area subtends an angular region which contains the angular region subtended by the viewing screen from that point whereby said screen in the presence of said ambient light and in the absence of light from said projecting means appears dark to a viewer in the viewing area.

5. In a projection system for projecting still and motion pictures upon screen areas having ambient light intensities thereabout comprising a screen, said screen being defined by a multiplicity of reflecting elements with the general reflecting plane of said elements being inclined, picture projection means having its projection beam incident upon said screen and inclined at an angle to the general reflecting plane of the elements with the axis of said projection beam intersecting a central portion of said screen, a viewing area in a direction at a similar angle to the elements to receive the projected imagery from said screen elements, each of said elements being subjectable to substantially parallel rays and reflecting the light therefrom throughout said viewing field with substantially uniform intensity throughout the viewing field, light obstructing means defining a light obstructing area through which said beam passes before being reflected by said screen into said viewing area, said light obstructing area being sufficiently large that, as viewed from any point in the viewing field, the optically reflected image of the light obstructing area subtends an angular region which contained the angular region subtended by the viewing screen from that point, so that light only from the light obstructing area, and no other light, is reflected into the viewing area whereby said screen, in the absence of said beam and in the presence of said ambient light appears dark to a viewer in the viewing area.

6. In a projection system for projecting still and motion pictures upon screen areas having ambient light intensities thereabout comprising a multiplicity of light reflecting elements that define a viewing screen having its general reflecting plane angularly inclined, picture projection means having its projection beam incident upon said screen and inclined at an angle with respect to said general plane of said screen, a viewing area in a direction at a similar angle to the viewing screen to receive the projected imagery from said elements of said screen, each of said elements being subjectable to substantially parallel rays and reflecting the light therefrom throughout said viewing field with substantially uniform intensity throughout the viewing field, said projection means being provided with surrounding light obstructing means that define a light obstructing area which encompasses said beam and which is of sufficient size and which is so optically related in position to the viewing area and reflection characteristics of said elements that all ambient light that originates in said viewing area enters said light obstructing area after reflection from the viewing screen, and, as viewed from any point in the viewing field, the optically reflected image of the light obstructing area subtends an angular region which contains the angular region subtended by the viewing screen from that point, said light reflecting elements each providing a substantially uniform distribution of effective reflecting tangent surfaces which are uniform with respect to angle throughout a predetermined solid angular range such that from each point in the viewing field, a ray directed to the screen and reflected from any of such elemental reflecting surfaces shall then pass through the light obstructing area.

7. A system as set forth in claim 3 including means for moving said screen in said plane at such a speed that the individual reflecting elements of the screen pass through a distance corresponding to their linear dimensions in no longer time than that required to achieve persistency of vision to enhance the quality of the imagery projected on to said screen.

8. A system as set forth in claim 4 including means for moving said screen in said plane at such a speed that the individual reflecting elements of the screen pass through a distance corresponding to their linear dimensions in no longer time than that required to achieve persistency of vision to enhance the quality of the imagery projected on to said screen.

9. A system as set forth in claim 5 including means for oscillating said screen in said plane at such a speed that the individual reflecting elements of the screen pass through a distance corresponding to their linear dimensions in no longer time than that required to achieve persistency of vision to enhance the quality of the imagery projected on to said screen.

10. A system as set forth in claim 6 including means for oscillating said screen in said plane at such a speed that the individual reflecting elements of the screen pass through a distance corresponding to their linear dimensions in no longer time than that required to achieve persistency of vision to enhance the quality of the imagery projected on to said screen.

11. A system as set forth in claim 3 in which said elements are specular reflecting elements.

12. In a system for receiving projected images on a screen in the presence of ambient light, a viewing field being a region having an unobstructed view in the face of said screen; light obstructing means subtending a region, as seen from the screen disjoint from the viewing field; a point, P, optically in front of said screen and located within the region subtended by the light obstructing means; said screen being compised of a plurality of light reflecting regions each of which has the property that substantially all of the effective normals, that is, normals to the surface of the region effective in the reflection of light rays lie within a prescribed solid angular cone of directions; each of said light reflecting regions having its said prescribed cone of directions of such size and so placed on and oriented with respect to the screen that, for each point, G, within the viewing area, there is an effective normal lying within the region's prescribed cone of directions which bisects the angle between the lines from the foot of said normal to the said points P and G; said light obstructing means being of such size and so located with respect to the screen that for each such point G and the foot H of each effective normal lying within any of the above mentioned prescribed cones of directions of any such light reflecting regions of the screen, the line through H and in front of the screen whose angle with the line GH is bisected by the normal to the surface through H passes through the light obstructing means.

References Cited in the file of this patent
UNITED STATES PATENTS

| | | |
|---|---|---|
| 1,624,816 | Triana et al. | Apr. 12, 1927 |
| 2,763,184 | Jackson | Sept. 18, 1956 |
| 2,780,136 | Erban | Feb. 5, 1957 |
| 2,804,801 | Mihalakis | Sept. 3, 1957 |
| 2,828,667 | Grossman | Apr. 1, 1958 |